Dec. 14, 1971   H. W. KOCH   3,626,743
MAKING CORRUGATED ELASTIC SHIMS
Filed Dec. 22, 1969   3 Sheets-Sheet 1

INVENTOR
HANS W. KOCH
BY
ATTORNEY

Dec. 14, 1971      H. W. KOCH      3,626,743
MAKING CORRUGATED ELASTIC SHIMS
Filed Dec. 22, 1969      3 Sheets-Sheet 2
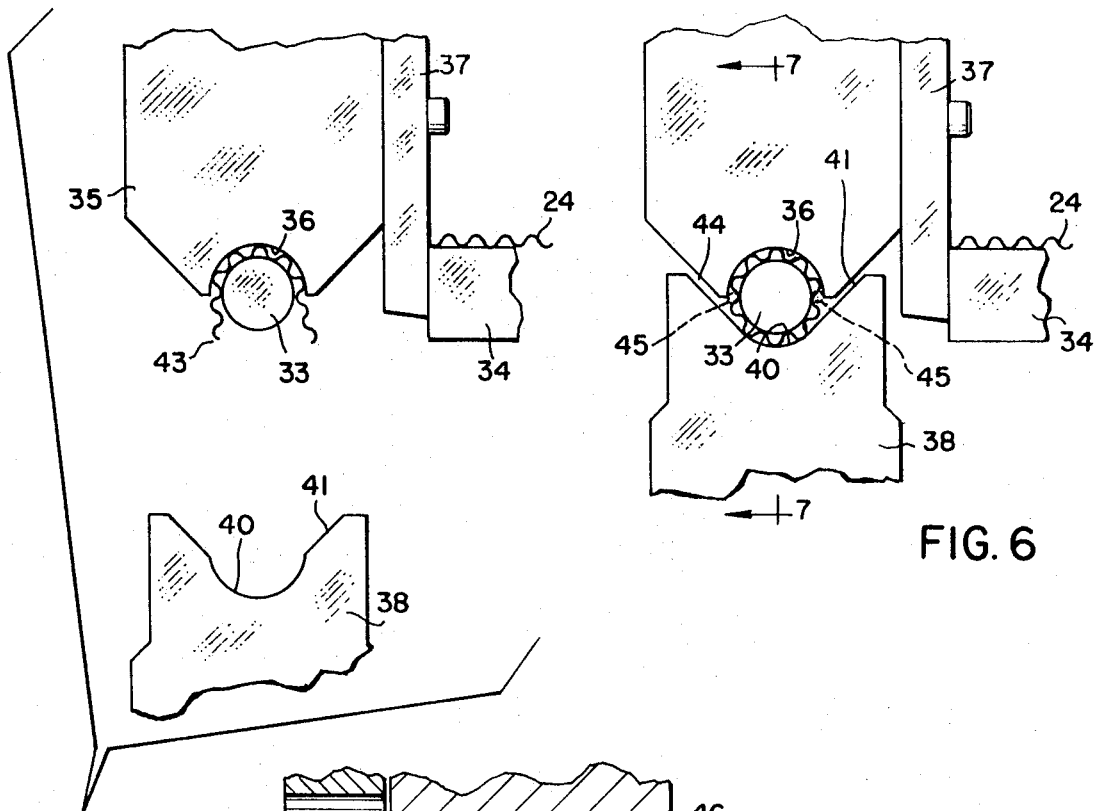
FIG. 5
FIG. 6
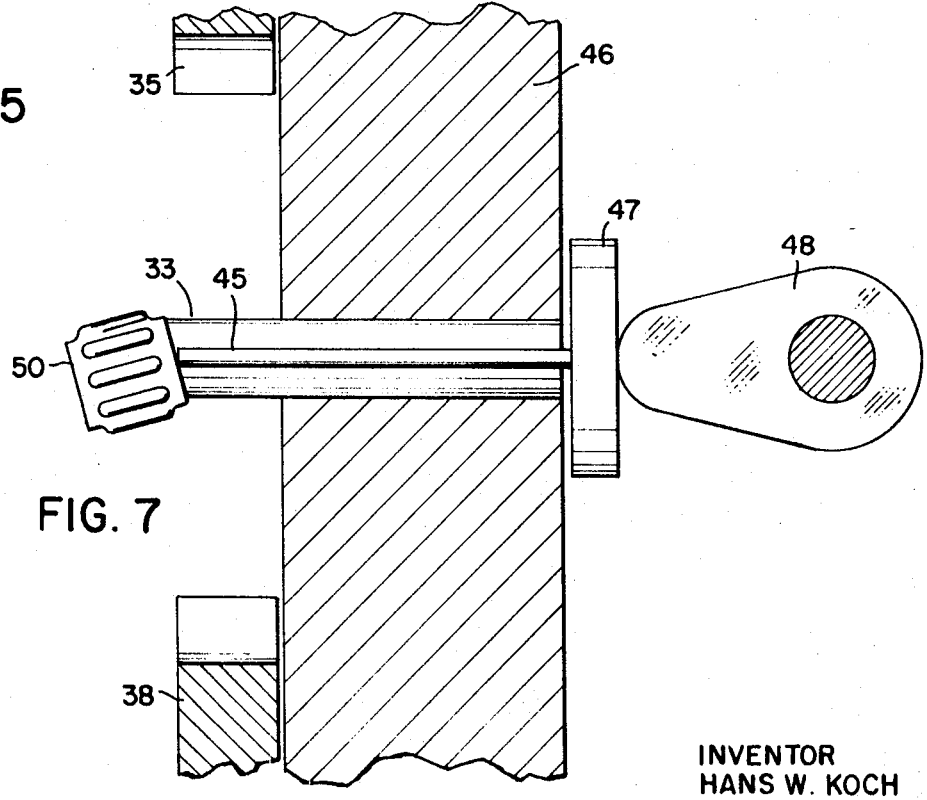
FIG. 7
INVENTOR
HANS W. KOCH
BY
*Jackson Jackson & Chovanes*
ATTORNEY

INVENTOR
HANS W. KOCH
BY
ATTORNEYS.

United States Patent Office 3,626,743
Patented Dec. 14, 1971

3,626,743
MAKING CORRUGATED ELASTIC SHIMS
Hans W. Koch, Levittown, Pa., assignor to Roller Bearing Company of America, West Trenton, N.J.
Filed Dec. 22, 1969, Ser. No. 887,463
Int. Cl. B21d 31/02, 43/10, 37/18
U.S. Cl. 72—330
7 Claims

ABSTRACT OF THE DISCLOSURE

In bending corrugated strip to make a corrugated elastic shim, a continuous strip is fed forward in a space between a circular mandrel and a first bending and cutting die cooperating with a mandrel, and the first die is moved forward to cut off a piece of strip in cooperation with an anvil and bend it into the shape of a U with the ends protruding away from the first bending die, without crushing the corrugations, and the second bending die cooperating with the mandrel on the side remote from the first bending die is moved forward to bend the piece of strip into a curved, circular or multisided shape without crushing the corrugations. In the preferred embodiments the bending dies and the mandrel grip the corrugated strip at the edges.

DISCLOSURE OF INVENTION

The present invention relates to mechanism and methods for forming corrugated elastic shims.

It is very desirable to mount a cylindrical member on a shaft or arbor without the necessity to cut a keyway into the shaft which might provide a focus of stress concentration and thus, encourage failure. It is also very desirable to avoid the expense of machining keyways and installing keys. Set screws may come loose and are also to be avoided. Extensive use in being made of corrugated elastic shims as shown in Dix and Wehr U.S. Pat. 3,061,386, granted Oct. 30, 1962, and Hulck, Kissingen and Schultes U.S. Pat. 3,142,887, granted Aug. 4, 1964, in order to mount various types of parts on a shaft or the like, such as bearings, sheaves, pulleys, gears and sprockets. In the prior art, corrugated elastic shims have been extensively made according to the Hulck et al. patent above referred to by forming a corrugated strip and rolling it in engagement with an elastic wheel against a forming mandrel.

Depending on the state of wear of the elastic wheel, its hardness and elasticity (which varies from wheel to wheel) and operating conditions, the shim may turn a shorter or a greater distance around the mandrel and this causes more or less flattening of the corrugations, so that in some cases the corrugated elastic shim is not effective to grip in a space between a shaft and a surrounding hole, in a cylindrical part, while in other cases the force required to insert the corrugated elastic shim may be excessive because the corrugations are unnecessarily deep. Extensive resizing and frequent rejections have resulted. Furthermore, a great deal of attention from the operator has been demanded to make adjustments to keep the elastic wheel in operation and the elastic wheel has required early replacement, adding to the expense.

Furthermore, the lack of consistency in the assembly force and the torque capacity of the corrugated elastic shims as made by the method previously described interfere with automatic assembly.

In another method of manufacturing corrugated elastic shims, the corrugated strip had been forced against the periphery of an idling wheel which is capable of rotation at the interior of a circular housing. In this case also, frequent adjustments of the idling wheel have been needed in order to produce corrugated elastic shims which conform to the required dimensional standards.

In accordance with the present invention, improved equipment and procedures are used for making corrugated elastic shims which overcome these difficulties.

Secondly, in the present invention the corrugated elastic shims produced are not subject to substantial variations in dimensions and there is no likelihood of crushing the corrugations so that the corrugations are of inadequate depth.

The corrugated elastic shims of the invention may be produced of any of a wide variety of spring materials, either steel heat treated to spring temper or cold worked to produce spring properties. In the case of the cold worked stock, the spring properties are produced before forming the corrugations, but in case of heat treated stock the heat treatment will usually be applied after forming and bending.

The material may be carbon steel such as AISI 1070 or 1074, hardened by heat treatment usually after bending, or stainless steel type 301 which is cold worked, usually before bending.

Other compositions of which corrugated elastic shims can be made are beryllium copper (subsequently heat treated), Phosphor bronze cold worked to spring properties or Monel cold worked to spring properties and containing:

| | Percent by weight |
|---|---|
| Nickel | 67 |
| Copper | 30 |
| Manganese | 1 |
| Iron | 1.5 |

In the drawings I have chosen to illustrate one only of the numerous embodiments in which the invention may appear, selecting the forms shown from the standpoints of convenience in illustration, satisfactory operation, and clear demonstration of the principles involved.

FIGS. 3 to 6 are step-wise diagrammatic elevations showing the cutting off and bending of a strip to form a corrugated elastic shim according to the invention.

FIG. 3 illustrates the start of the operation, with a strip advanced and the dies retracted.

FIG. 4 is a view similar to FIG. 3 showing the first or upper die advanced far enough to shear the strip.

FIG. 5 is an enlarged view showing the first or upper die advanced far enough to complete the bending of the strip into a horseshoe or U formation.

FIG. 6 is an enlarged view similar to FIG. 3 showing the second or lower die advanced so as to complete the bending of the strip into a curved or multi-sided shape.

FIG. 7 is a section of FIG. 6 on the line 7—7, but with the dies separated as in FIG. 1 and the ejector advanced to eject the corrugated elastic shim from the mandrel prior to the beginning of the next cycle, omitting the showing of relief of the dies or mandrel.

Figure 1:
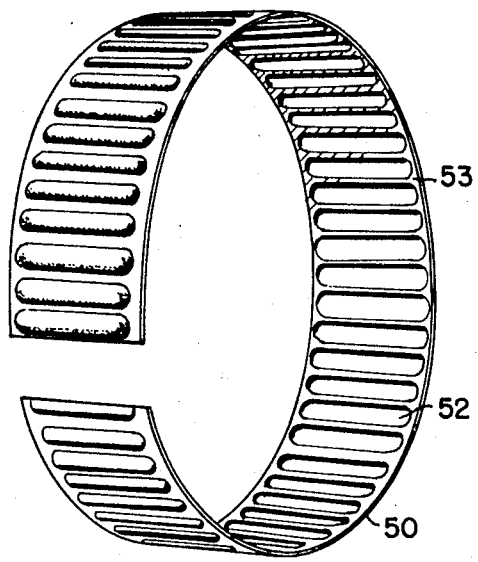
FIG. 1 is a perspective of one form of corrugated elastic shim produced according to the invention.

Considering the drawings in detail, continuous metallic strip 20 (FIG. 3) of spring steel or steel capable of being converted into a spring by heat treatment, is paid off from a reel 21 and fed through upper and lower corrugating rolls 22 and 23, the detail of which is not important in the present invention. The rolls may be idling and intergeared (not shown). As a result, corrugated strip 24 is produced which is fed forward and engaged by upper and lower gripping jaws 25 and 26 of a feed mechanism 27, the gripping jaws, as well-known in the art, coming together to grip the strip (but not to crush the corrugations) as suggested by arrow 28, then moving forward to feed the strip through one forward increment as suggested by arrow 30 and then releasing the strip as suggested by arrow 31 and moving backward one increment as suggested by arrow 32. An increment provides the length of strip to make one corrugated elastic shim.

Figure 8:
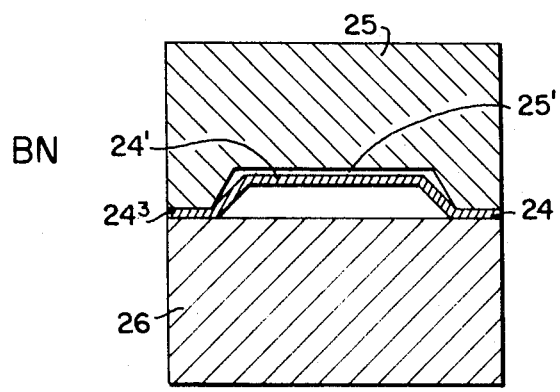
FIG. 8 is a transverse section through the gripping jaws of FIG. 3, designed for use on corrugated elastic shims of BN type.
Figure 9:
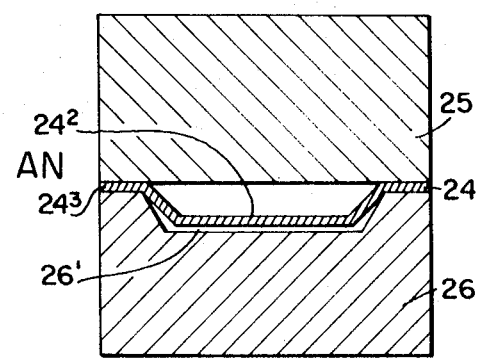
FIG. 9 is a transverse section through the gripping jaws of FIG. 3, intended for use on corrugated elastic shims of AN type.

In order to permit gripping the corrugated elastic strip, it is corrugated over only part of its width, suitably at the middle. Depending on the type of corrugations, the upper gripper 25 is relieved at $25^1$ to avoid crushing BN type corrugations $24^1$ (FIG. 8) or the lower gripper 26 is relieved at $26^1$ to avoid crushing AN type corrugations $24^2$ (FIG. 9). In either case the grippers 25 and 26 engage one or both edges $24^3$ of the corrugated strip as shown.

A circular mandrel 33 is located immediately beneath the strip as it moves forward, the axis of the mandrel being transverse to the direction of forward motion of the corrugated strip 24. As the strip moves forward it also rides over the anvil 34 which aids in shearing as later explained.

Cooperating with the upper side of the mandrel 33 is a first or upper bending die 35 which has a cup or semi-circular shaped recess 36 and, as suggested by the arrow 37', is capable of moving between a position remote from the mandrel and a position at which it bends the strip around the mandrel without, however, crushing or deforming the corrguations. The upper die 35 carries with it, on the side from which the strip arrives, a shear blade 37 which cooperates with the anvil 34 to shear the strip as later explained.

Lower or second bending die 38 cooperates with the opposite side of the mandrel and has a cup shaped or semi-circular recess 40 and diverging bending lips 41. As suggested by arrow 42, it moves between a remote position and a position in which it bends the ends of the piece of strip into a curve or multi-sided shape, without however, crushing or deforming the corrugations.

Figure 3:
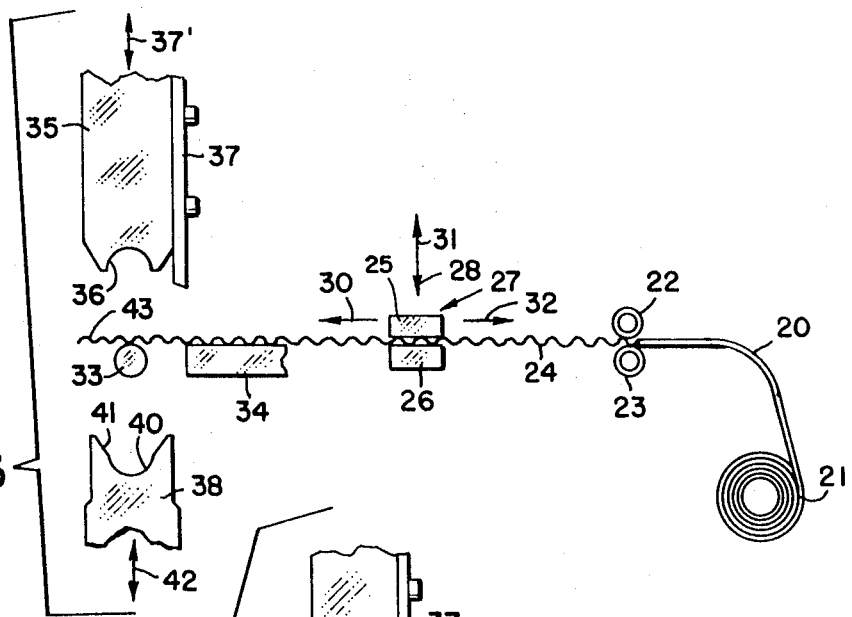

As shown in FIG. 3, both the upper die 35 and the lower die 38 are remote from the mandrel and the strip has been fed one increment into the forming space, providing a piece of material 43 to make one corrugated elastic shim.

Figure 4:
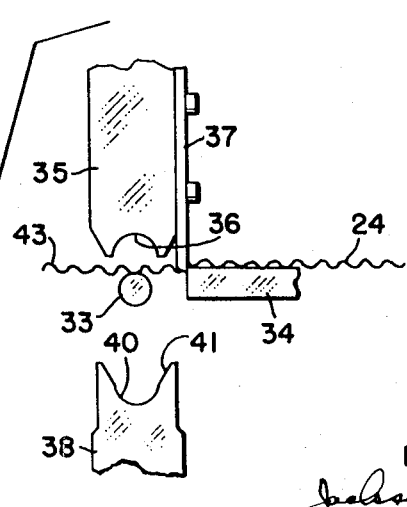

As shown in FIG. 4, the upper die 35 has begun its downward stroke toward the mandrel until the shear blade 37 cuts off the piece of strip 43 against the support of the anvil 34.

As shown in FIG. 5, the upper die 35 has now continued its forward motion until the semi-circular or other suitable bending recess 36 has engaged the piece of strip 43 and bent it around the mandrel into the shape of a U with the ends protruding equally on opposite sides of the mandrel. The upper die has not crushed the corrugations.

In FIG. 6 the lower die 38 has moved upward until the ends of the U have been engaged by its diverging lips 41 which slope to cooperate with relieved portions 44 on the upper die, and then the ends of the U have been received in the semi-circular portion 40 of the lower die and bent to complete a curved, circular or multi-sided shape. At the same time the lower die has not plastically deformed the corrugations.

In the next step as shown in FIG. 7, the upper and lower dies have moved back to the retracted position and ejector pins 45, passing at opposite sides of the mandrel through openings in a mandrel support 46 behind the mandrel, are pushed forward by follower 47 engaged by a cam 48 to eject a completed corrugated elastic shim 50 from the mandrel. The follower 47 releases when permitted by the cam under spring bias (not shown).

The tolerance ring 50 as best shown in FIG. 1 has a series of lozenge shaped corrugations 52 leaving a rim 53 at each edge into which the corrugations do not extend as shown in FIG. 1.

Figure 10:
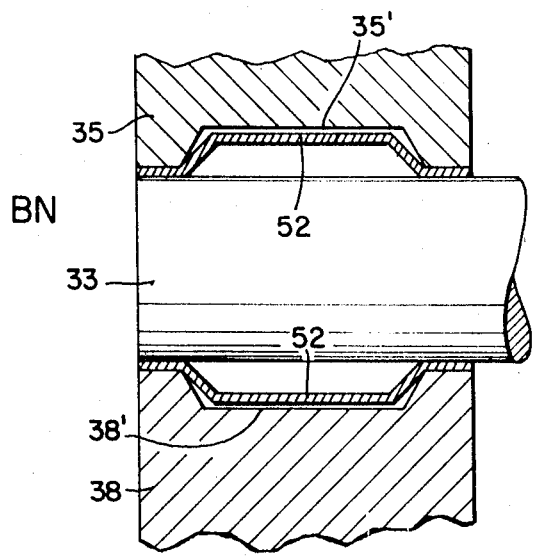
FIG. 10 is a fragmentary enlarged section on the line 7—7 of FIG. 6, showing the bending dies and mandrel for bending BN type corrugated elastic shims.
Figure 11:
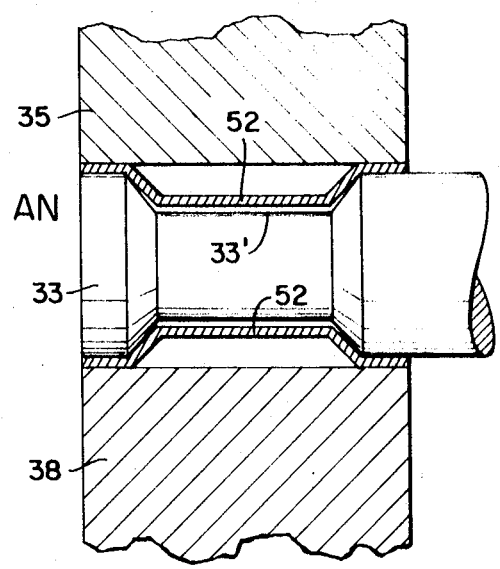
FIG. 11 is a fragmentary enlarged section on the line 7—7 of FIG. 6, showing the bending dies and mandrel for bending AN type corrugated elastic shims.

In order to avoid crushing the corrugations, the bending dies engage the corrugated elastic shim at one or both rims and not in the corrugations. Thus if the corrugations are of BN type as shown in FIG. 10, the upper bending die 35 has a middle recess 35' to avoid contacting the corrugations 52, and the lower bending die 38 has a middle recess 38' to avoid similar contact. If the corrugated elastic shim is of AN type, the mandrel 33 has a middle recess 33' to protect the corrugations 52.

The corrugated elastic shim, as explained in Roller Bearing Company of America catalog entitled Star Tolerance Rings (1961) may be either of the AN type which is first placed in the recess of a gear or the like, and then the shaft is forced into the corrugated elastic shim, or of the BN type which is first placed around a shaft (suitably in an annular recess on the outside), and then the shaft and corrugated elastic shim is forced into the recess of a gear or the like.

Figure 2:
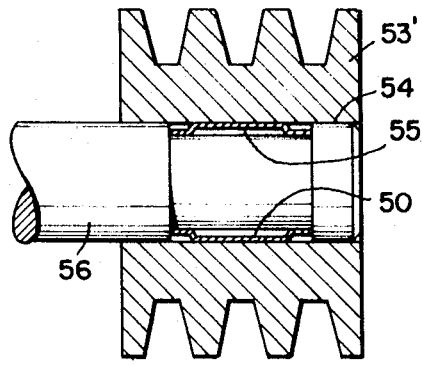
FIG. 2 is an axial section of a corrugated elastic shim holding a pulley in place on a shaft.

FIG. 2 illustrates a pulley 53' having an axial opening 54 which receives a type BN corrugated elastic shim 50 resting in a recess 55 on shaft 56.

It will be evident that in forming corrugated elastic shims by the present invention, the difficulties in manufacture by wearing and frequently replacing elastic wheels and adjusting the elastic wheels are avoided Furthermore, by the present invention, the corrugated elastic shims are produced without the considerable variation in dimensions which occurred in prior manufacturing techniques. Subsequent resizing or rejection of defective corrugated elastic shims is thus avoided.

It will be evident that the configuration of the corrugated elastic shim as bent will in normal practice be somewhat overbent to allow for springback. As it is removed from the bending mechanism it will normally have a generally closed configuration, which may be circular, elliptical, or multi-sided, depending upon the contour of the parts which it is to assemble.

In view of my invention and disclosure, variations and modifications to meet individual whim or particular need will doubtless become evident to others skilled in the art, to obtain all or part of the benefits of my invention without copying the structure and method shown, and I therefore claim all such insofar as they fall within the reasonable spirit and scope of my claims.

Having thus described my invention, what I claim as new and desire to secure by Letters Patent is:

1. In mechanism for bending corrugated metallic strip to make a corrugated elastic shim, a mandrel, a first bending die cooperating with the mandrel and movable from a position remote from the mandrel to a position in which it forms strip into a bent shape against the mandrel and holds it with ends protruding away from the first bending die, means for feeding a corrugated strip of predetermined length into the space between the first bending die and the mandrel, said means for feeding comprising gripping means for advancing the strip engaging it only at the rim, a second bending die cooperating with the opposite side of the mandrel from that adjacent the first bending die and movable from a position remote from the strip to a position at which it bends the protruding ends into a generally closed shape, when the first and second bending dies bend the strip against the mandrel there being a clearance from engagement in the corrugations which prevents crushing the corrugations.

2. A method of bending corrugated strip into a closed shape, using a mandrel and opposed bending dies, which comprise feeding a piece of corrugated strip of predetermined length into a space between the mandrel and the first bending die, bending the piece of strip around the mandrel into a U by advancing the first bending die and clamping the piece of strip with its ends protruding, without crushing the corrugations, and bending the piece of strip into a closed shape by advancing the second bending die against the mandrel without crushing the corrugation.

3. A method of claim 2, which comprises gripping the piece of strip only on a rim when feeding the strip.

4. A method of claim 2, which comprises feeding the piece of strip by feeding a continuous strip into the space between the mandrel and the first bending die while it engages the mandrel, and cutting off the continuous strip by action of a shear blade on the first bending die against an anvil to shear the strip.

5. A method of claim 2, which comprises bending the strip by engagement only with the rim of the strip while providing clearance from the corrugations.

6. Mechanism of claim 1, in which the clearance receiving the corrugations is in the mandrel.

7. Mechanism of claim 1, in which the clearance receiving the corrugations is in the first and second bending die.

References Cited
UNITED STATES PATENTS

| | | | |
|---|---|---|---|
| 2,116,971 | 5/1938 | Haslauer | 72—381 X |
| 2,710,041 | 6/1955 | Stanbery | 72—422 X |
| 1,771,028 | 12/1928 | Bronson | 72—385 |
| 1,973,436 | 9/1934 | Hjort | 72—337 |

RICHARD J. HERBST, Primary Examiner

R. M. ROGERS, Assistant Examiner

U.S. Cl. X.R.

72—422, 463